(12) United States Patent
Priestman et al.

(10) Patent No.: US 7,349,004 B2
(45) Date of Patent: *Mar. 25, 2008

(54) MOBILE TELEPHONE HANDSET

(75) Inventors: Paul Priestman, London (GB); Oliver King, London (GB); Sean Lewis, London (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/107,305

(22) Filed: Apr. 15, 2005

(65) Prior Publication Data
US 2005/0245288 A1    Nov. 3, 2005

Related U.S. Application Data

(63) Continuation of application No. 10/281,419, filed on Oct. 25, 2002, now abandoned, which is a continuation of application No. 09/700,248, filed on Nov. 8, 2000, now Pat. No. 6,812,954.

(30) Foreign Application Priority Data
May 8, 1998    (GB)    ................. 9809976.5

(51) Int. Cl.
H04N 7/14    (2006.01)

(52) U.S. Cl. .................... 348/14.01; 455/550

(58) Field of Classification Search .. 348/14.01–14.02, 348/14.04, 14.16; 379/93.7, 93.23, 433.02–433.04, 379/433.13, 433.3, 420.01–420.04, 388.02, 379/413.04; 455/550, 556, 557, 566, 90, 455/556.1; 381/388
See application file for complete search history.

(56) References Cited

U.S. PATENT DOCUMENTS

| | | | |
|---|---|---|---|
| 4,258,387 A | 3/1981 | Lemelson et al. | |
| 4,400,725 A | 8/1983 | Tanigaki | |
| 4,450,495 A | 5/1984 | Naruki | |
| 4,499,725 A | 2/1985 | Sbrizzai | |

(Continued)

FOREIGN PATENT DOCUMENTS

DE    3323858    1/1985

(Continued)

OTHER PUBLICATIONS

International Search Report for International Application No. PCT/GB99/01383 mailed Nov. 25, 1999.

Primary Examiner—Vivian Chin
Assistant Examiner—Lao Lun-See
(74) Attorney, Agent, or Firm—Knobbe Martens Olson & Bear, LLP

(57) ABSTRACT

A mobile telephone handset comprising a radio telecommunications interface for wirelessly transmitting and receiving radio signals to and from a mobile telecommunications network is disclosed. The handset comprises first and second audio loudspeakers positioned to output audio from two different locations on the handset, wherein the first audio loudspeaker is mounted on a first portion and the second audio loudspeaker is mounted on a second, different portion, and wherein the first and second portions are movable from a first relative position in which the handset is compact and in which the audio loudspeakers are relatively closely spaced to a second relative position in which the audio loudspeakers are relatively widely spaced.

17 Claims, 5 Drawing Sheets

U.S. PATENT DOCUMENTS

| | | | |
|---|---|---|---|
| 4,525,745 A | 6/1985 | Ghaem-Maghami et al. | |
| 4,525,746 A | 6/1985 | Mangold et al. | |
| 4,928,301 A | 5/1990 | Smoot | |
| 5,111,498 A | 5/1992 | Guichard et al. | |
| 5,177,784 A * | 1/1993 | Hu et al. | 379/430 |
| 5,282,027 A | 1/1994 | Tanigaki et al. | |
| 5,406,027 A | 4/1995 | Matsumoto et al. | |
| 5,414,444 A * | 5/1995 | Britz | 345/156 |
| 5,491,507 A * | 2/1996 | Umezawa et al. | 348/14.02 |
| 5,550,754 A | 8/1996 | McNelley et al. | |
| 5,675,426 A | 10/1997 | Meisner et al. | |
| 5,748,725 A | 5/1998 | Kubo | |
| 5,841,849 A | 11/1998 | Macor | |
| 5,907,615 A | 5/1999 | Kaschke | |
| 5,940,229 A | 8/1999 | Baumgarten | |
| 5,953,048 A | 9/1999 | Mikami et al. | |
| 5,983,073 A * | 11/1999 | Ditzik | 455/11.1 |
| 5,999,821 A | 12/1999 | Kaschke | |
| 6,005,604 A | 12/1999 | Kakii | |
| 6,069,648 A | 5/2000 | Suso et al. | |
| 6,151,401 A * | 11/2000 | Annaratone | 381/388 |
| 6,154,540 A | 11/2000 | Kaschke | |
| 6,157,718 A | 12/2000 | Kaschke | |
| 6,177,950 B1 | 1/2001 | Robb | |
| 6,211,903 B1 * | 4/2001 | Bullister | 348/14.16 |
| 6,346,964 B1 | 2/2002 | Rogers et al. | |
| 6,559,825 B2 | 5/2003 | Jacobsen et al. | |
| 6,812,954 B1 * | 11/2004 | Priestman et al. | 348/14.01 |
| 2001/0000676 A1 | 5/2001 | Zhang et al. | |

FOREIGN PATENT DOCUMENTS

| | | |
|---|---|---|
| DE | 19528424 | 11/1996 |
| EP | 0493893 | 7/1992 |
| EP | 0596558 | 5/1994 |
| EP | 0776140 | 5/1997 |
| EP | 0796026 | 9/1997 |
| EP | 0798650 | 10/1997 |
| EP | 0859272 | 8/1998 |
| EP | 0898223 | 2/1999 |
| EP | 0898405 | 2/1999 |
| FR | 2746997 | 10/1997 |
| GB | 2295744 | 6/1996 |
| GB | 2314179 | 12/1997 |
| GB | 2317531 | 3/1998 |
| GB | 2322504 | 8/1998 |
| JP | 07143468 | 6/1995 |
| JP | 07240722 | 9/1995 |
| JP | 9247250 | 9/1997 |
| JP | 9247734 | 9/1997 |
| JP | 10065780 | 3/1998 |
| JP | 10313452 | 11/1998 |
| JP | 11112860 | 4/1999 |
| JP | 11219249 | 8/1999 |
| WO | WO 95/20296 | 7/1995 |
| WO | WO 97/26744 | 7/1997 |
| WO | WO 97/43852 | 11/1997 |
| WO | WO 99/27433 | 6/1999 |

* cited by examiner

MOBILE TELEPHONE HANDSET

CROSS REFERENCE TO RELATED APPLICATION

This application is a continuation of U.S. patent application Ser. No. 10/281,419 entitled "MOBILE COMMUNICATIONS" filed on Oct. 25, 2002 now abandoned, which is a continuation of U.S. patent application Ser. No. 09/700,248 filed on Nov. 8, 2000 now U.S. Pat. No. 6,812,954. The disclosures of the above-described filed applications are hereby incorporated by reference in their entirety.

BACKGROUND

1. Field of the Invention

The invention relates generally to a mobile telephone handset comprising a radio telecommunications interface for wirelessly transmitting and receiving radio signals to and from a mobile telecommunications network. More specifically, but not exclusively, the invention relates to a mobile telephone handset capable of receiving and transmitting information in cellular radio networks.

2. Description of Related Technology

Mobile telephone handsets have been provided with various different constructions and functionalities.

Some mobile telephone handsets have been provided with cameras. U.S. Pat. No. 5,414,444 (AT&T) describes a communicator having an openable cover which contains an LCD-type display and a video camera. In this document, the video camera is reorientable when the cover is open, and the communicator includes mechanical apparatus interactive with the closing of the cover to reset the camera to a standard position after use.

A form of mobile telephone handset is proposed in PCT publication number WO97/26744. This document describes a telephone having a display and a camera mounted in the main body of the phone. The camera is mounted on a rotational pivot to enable it to receive images from various directions.

SUMMARY OF CERTAIN INVENTIVE ASPECTS

The present invention aims to provide improvements, in the functionality and construction of mobile telephone handsets.

Accordingly, the invention in one aspect provides a mobile telephone handset comprising a radio telecommunications interface for wirelessly transmitting and receiving radio signals to and from a mobile telecommunications network, the handset comprising:

first and second audio loudspeakers positioned to output audio from two different locations on the handset, and a first portion and a second, different portion, wherein the first audio loudspeaker is mounted on the first portion and the second audio loudspeaker is mounted on the second portion, and wherein the first and second portions are movable from a first relative position, in which the handset is compact and in which the audio loudspeakers are relatively closely spaced, to a second relative position in which the audio loudspeakers are relatively widely spaced.

The invention in a further aspect provides a mobile telephone handset comprising a radio telecommunications interface for wirelessly transmitting and receiving radio signals to and from a mobile telecommunications network, the handset comprising:

first and second audio loudspeakers positioned to output audio from two different locations on the handset, and a first portion and a second, different portion, wherein the first audio loudspeaker is mounted on the first portion and the second audio loudspeaker is mounted on the second portion, wherein the first and second portions are movable from a first relative position, in which the handset is compact and in which the audio loudspeakers are relatively closely spaced, to a second relative position in which the audio loudspeakers are relatively widely spaced, wherein the first and second portions are pivotally connected by a hinge mechanism such that the first and second portions are rotatable about a common axis relative to one another, from the first relative position to the second relative position, wherein the first and second loudspeakers are located near to ends, of the first and second portions respectively, which are each remote from the pivotal connection, and wherein the handset is capable of generating a stereo audio output, and wherein in the second relative position the loudspeakers can be positioned to transmit the stereo audio output to a user in front of the handset.

The invention in a yet further aspect provides a mobile telephone handset comprising a radio telecommunications interface for wirelessly transmitting and receiving radio signals to and from a mobile telecommunications network, the handset comprising:

first and second audio loudspeakers positioned to output audio from two different locations on the handset, a first portion and a second, different portion, wherein the first audio loudspeaker is mounted on the first portion and the second audio loudspeaker is mounted on the second portion, wherein the first and second portions are movable from a first relative position, in which the handset is compact and in which the audio loudspeakers are relatively closely spaced, to a second relative position in which the audio loudspeakers are relatively widely spaced, wherein the first and second portions are pivotally connected by a hinge mechanism such that the first and second portions are rotatable about a common axis relative to one another, from the first relative position to the second relative position, wherein the first and second loudspeakers are located proximate ends, of the first and second portions respectively, which are each remote from the pivotal connection, wherein the handset is configured to generate an audio output, and wherein in the second relative position the loudspeakers can be positioned to transmit the audio output to a user in front of the handset, wherein the handset includes a graphics display configured to generate video output and wherein in the second relative position the graphics display is configured to transmit the video output to the user in front of the handset, and wherein the handset is capable of performing the video output in conjunction with the audio output.

BRIEF DESCRIPTION OF THE DRAWINGS

Further aspects and advantages of the invention will be apparent from the following, in which embodiments of the invention will now be described, by way of example only, with references to the accompanying drawings in which.

DETAILED DESCRIPTION OF CERTAIN INVENTIVE EMBODIMENTS

Figure 1:
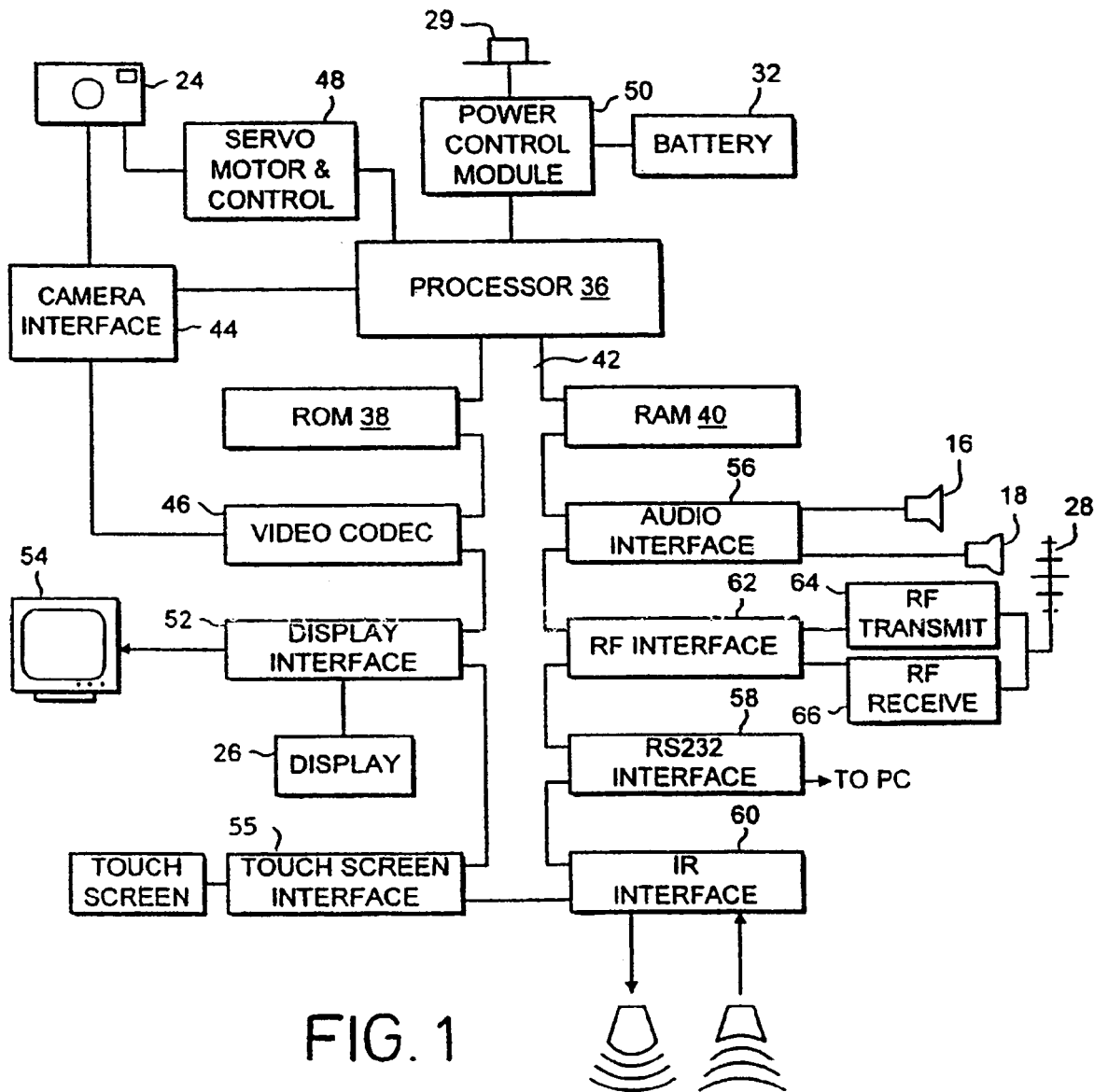
FIG. 1 is a schematic block diagram of the functional elements of a videophone.

FIG. 1 shows a schematic block diagram of the main functional elements which may be included commonly to the different embodiments of the invention, which elements are each individually known and will not be described in detail herein. A main processor 36 may be a conventional programmable microprocessor, or a special purpose of specifically configured unit (e.g., a digital signal processor) could alternatively be used. A read-only memory (ROM) 38 is connected to the processor 36 for the storage of control programs, data and images. The ROM 38 can be implemented by any appropriate technology, for example, by a flash PROM. A random-access memory (RAM) 40 is connected to the processor 36 via a bus 42, is used as a working storage and for the storage of data and images capturing using a CCD video camera 24.

Signals relating to the data captured by the camera are passed via a camera interface 44 to the processor 36 to be processed. The camera interface 44 also provides the video codec 46 with a digital representation of the captured data from the camera 24, where it can be suitably processed for display and/or transmission to the mobile communications system an indicator light may be connected to the processor to report successful capture of data and/or images from the camera 24 and may also be used during video conferencing to indicate the correct usage of the device.

The camera interface 44 carries out all the signal conditioning as required on receiving images from the camera 24. Signal conditioning will depend on the exact configuration of the camera but preferably comprises signal conditioning to enable accurate analogue to digital conversion with sufficient buffering of the captured data. The camera 24 will include all the support circuitry to produce a fully functional camera delivering a fully formatted video signal. The camera 24 may also include circuitry to regulate the voltage for power supply control and a suitable output buffer to directly drive a standard VDU should the videophone connected to an external device.

The camera 24 may be fixed in a predetermined orientation in the central portion 10. Alternatively, the camera 24 may be provided with suitable mechanism to allow adjustment of the orientation of the camera to enable the user to point the camera in alternative directions. The positioning of the camera 24 can be adjusted manually or a servo motor may be provided to alter the positioning. The servo motor is connected to the processor 36 via a controller 48.

The on/off button 29 is connected via a suitable interface to a power control module 50. The power control module 50 responds to the operation of this button in a powered down state to connect the battery 32 to the processor 36. The power control module 50 may also control the charging of the battery 32. The power control module 50 will also control the power requirements when a standard AC/DC power supply is connected to the videophone.

A display interface 52 connects the display 26 via the bus 42 to the processor 36. The display interface 52 responds to instructions from the processor 136 to drive the built-in display 26 in a conventional manner. The display interface 52 may also incorporate the circuitry to drive a standard external video display unit via a suitable connector 54.

The display 26 is provided with a touch-screen. A touch-screen interface 55 couples the touch-sensitive display 26 to the processor 36 via the bus 42. The touch-screen is a device independent of the video display 26, for example, a transparent touch-screen membrane is placed over the display 26 and connected appropriately.

The processor 36 can be arranged to transmit to the display 26 a menu of user selectable items, and to be responsive to a location at which the screen is touched for input of the user selection of an item. The touch-sensitive screen can then thus be used as a dynamic and reconfigurable user interface. Touch-screen entry can be used in place of or in addition to the entry's commands from an external keyboard or voice command if appropriate. Additionally, the touch-screen area can be configured as a general purpose scribing area to allow entry of data and written commands.

An audio interface 56 connects the audio receiver means, consisting of one or more microphones 18 and audio transmitter means such as one or more ear-pieces and/or speakers 16 to the processor 36 and carries out all of the signal conditioning as required to output audio signals and to receive audio signals.

The videophone includes infrared data reception and transmission capabilities and a suitable infrared interface 60 is provided. The infrared interface connects an infrared port to the processor 36 via the bus 42.

A radio-frequency (RF) interface 62 is also connected via the bus 42 to convert any data to be transmitted into signals for driving an RF transmitter 64, and converts signals from an RF receiver 66 into data to be passed via the bus to the relevant interfaces. The RF transmitter 64 and the RF receiver 66 are connected to a radio antenna 28. This RF interface 62 consequently enables wireless communications between the videophone and the mobile communications system.

The processor 36 is programmed by means of control programs and data stored in the ROM 38 and in use, the RAM 40, to receive signals from the camera 24 via camera interface 44, to the interpret those signals and to derive data therefrom which are displayed on display 26 and which can be stored in the RAM 40 or any other suitable memory device.

Other interfaces may be included to increase the flexibility of the unit, for example, RS232 interface 58 may be included, for transmitting and receiving data in RS232 format. The RS232 interface enables the processor 36 to be connected via the bus 42 to allow the connection of other compatible devices to the videophone through a standard RS232 cable.

Depending on the refresh rate used and the number of pixels used in the images, video image data transmitted and received by the videophone may require compression for transfer via a low data rate radio channel, such as those currently available in known cellular radio networks. The video data may be compressed using the MPEG-4 standard. Alternatively, the video images captured may be compressed into a different format suitable for transmitting the data derived across the mobile communications system, such as that disclosed in the International Patent Publication WO95/20296.

Figure 2A:
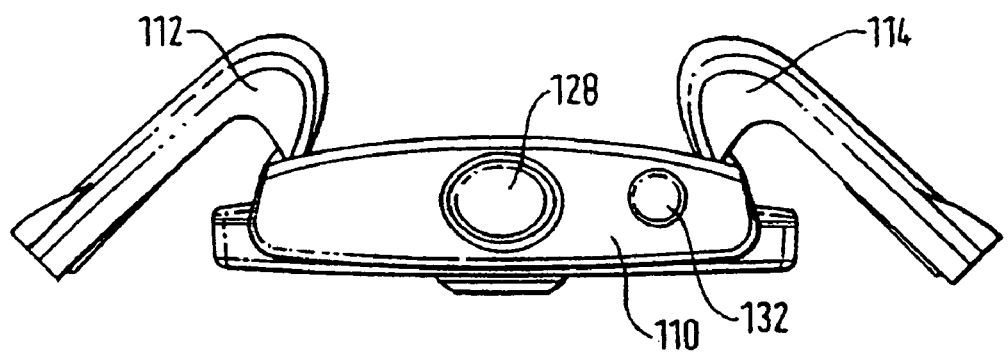
FIG. 2A is a plan view of one embodiment of a videophone.
Figure 2B:
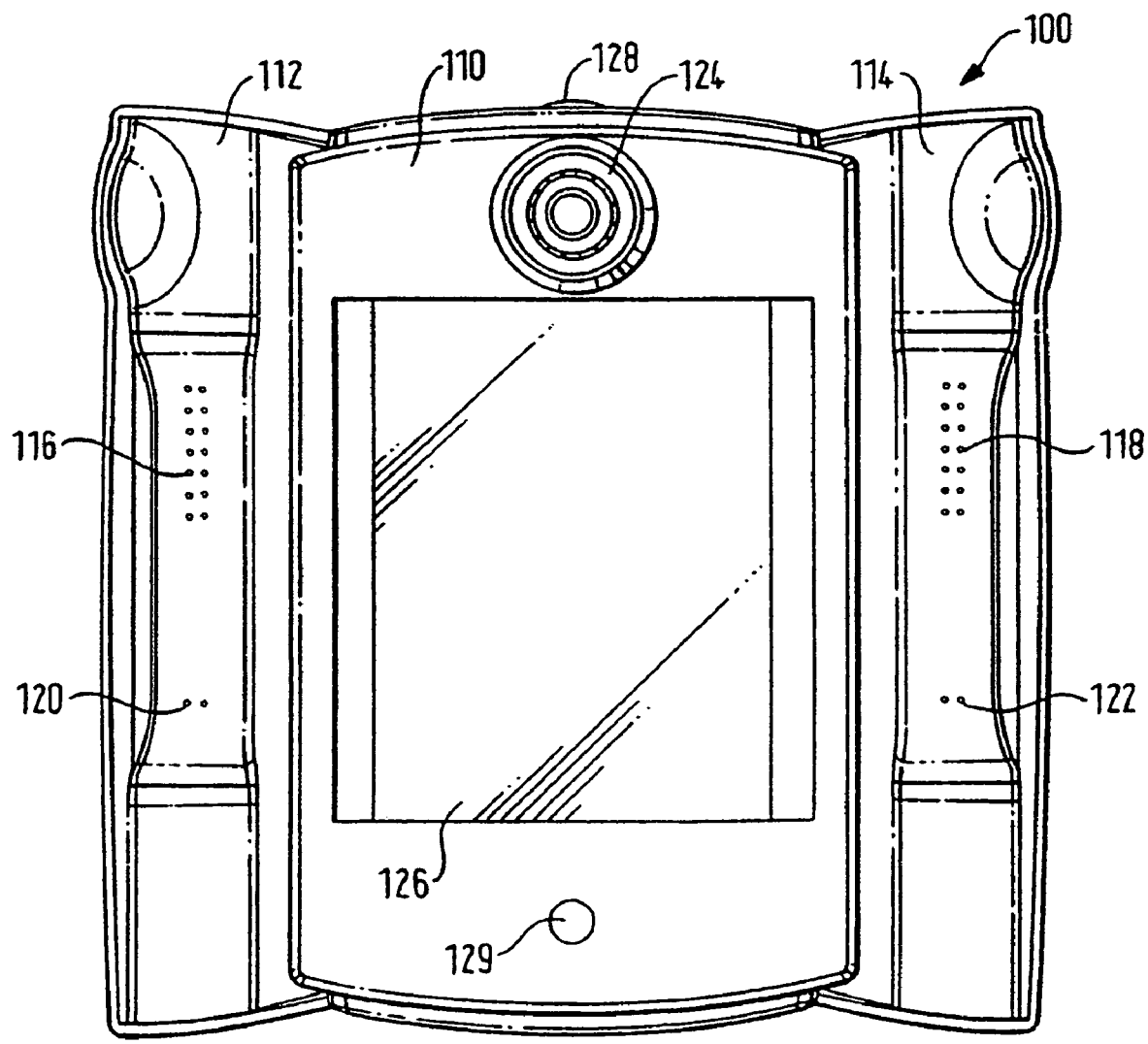
FIG. 2B is a schematic front view of the videophone of FIG. 2A.

FIGS. 2A and 2B are schematic views from above and from the front of a first embodiment of the portable videophone. The videophone 100 is capable of transmitting and receiving audio and visual data in a mobile communications system. The videophone 100 comprises a central portion 110 and two doors 112, 114. The doors 112, 114 are hingeably attached to the central portion 110 by hinging means, for example a dowel arrangement. The doors 112, 114 in FIGS. 2A and 2B are shown in their open position. Each door 112, 114 includes a speaker 116, 118 and a microphone 120, 122, to provide stereo sound reception and transmission when open. The central portion 110 includes a video camera 124.

On the front surface of videophone 100 as shown in FIG. 2B, a display screen 126 is provided to convey video images or functional information to the user. The display screen preferably comprises a suitable two-dimensional colour liquid crystal display which may be back-lit. Furthermore, the display screen in this embodiment is preferably a touch-screen which allows the user to input commands and raw data using a removable stylus 134. The touch-screen is used to display video images received. It will be appreciated that any other form of display capable of displaying functional information or video images may be used.

An antenna 128 is located in the body of the videophone 100. The antenna 128 is connected to associated radio transmitter and receiver components also contained within the videophone.

Figure 3A:
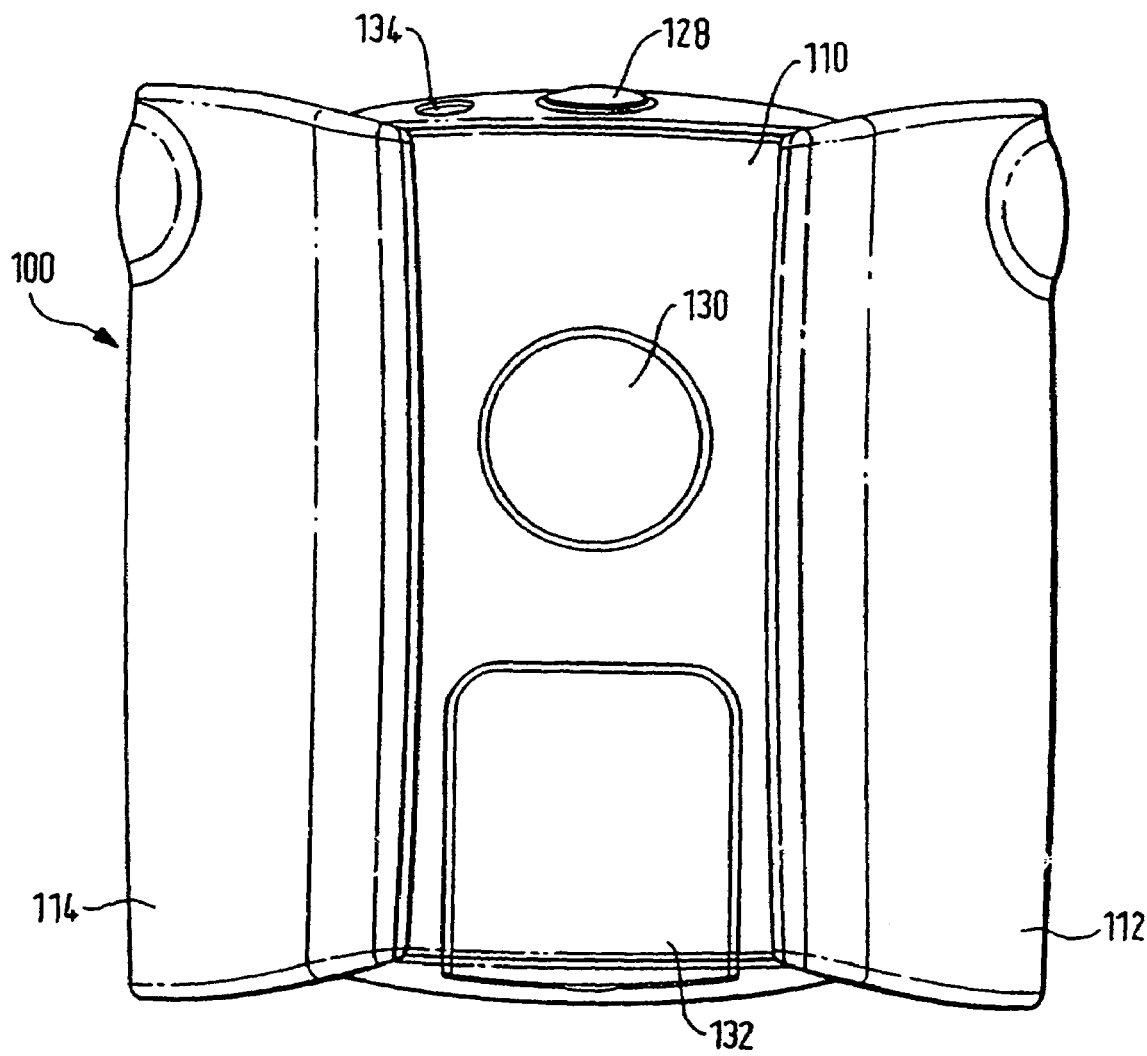
FIG. 3 is a schematic rear view of the videophone of FIGS. 2A & B.
Figure 3B:
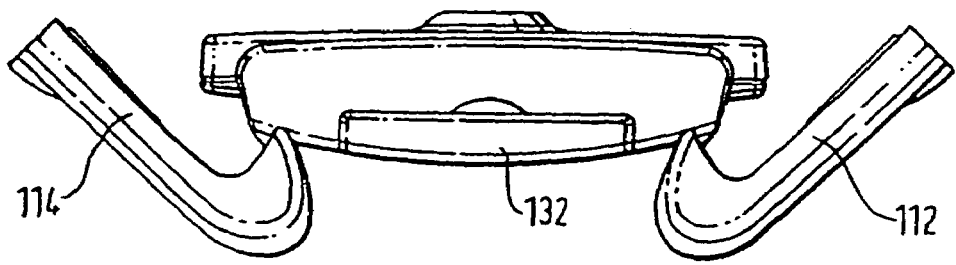

The videophone is powered using a DC battery 132, located in the rear of the central portion of 110 of the videophone 100 as shown in FIGS. 3A and 3B. The battery 132 can be recharged from a standard AC/DC power supply (not shown). In the embodiment shown, the battery is additionally removable and may be charged in an appropriate charging receptacle. However, a jack-plug and socket arrangement may be provided to enable the battery to be charged in situ on the videophone 100.

The videophone 100 has an infrared communications part 129 to provide proximal wireless transfer of data with compatible devices.

A removable ear-piece 130 is located in the rear of the central portion 110 as shown in FIG. 3A. The removable ear-piece 130 in the example shown is connected to the central portion 110 by a wire connection (not shown). Removal of the ear-piece from the body of the videophone automatically disables the speakers 116, 118 and activates the earpiece, to allow a user privacy of hearing if desired.

The infrared port 129 may also be used to transfer signals between the videophone 100 and the removable ear-piece 130, which then need not be connected to the central portion 110 by means of a wire connection.

The camera 124 may also be removable and connected to the videophone 100 by the infrared communications port 129.

The videophone 100 may also be provided with suitable connection means for connection of the videophone to an external video display unit, external speakers, external microphones or an external video camera, if required.

The doors 112, 114 when in the open position as shown in FIG. 2B advantageously provide the videophone 100 with support in various orientations if, for example, a user wished to stand the unit on a horizontal surface the doors 112, 114 are movable from the open position as shown in FIG. 2B to a closed position (not shown) in which the two doors abut and cover the entire front of the videophone 100 thereby protecting the display 126 and the camera 124. In one embodiment the doors are independently movable and it is possible to shut door 112 whilst leaving door 114 in the open position. Alternatively, the doors 112, 114 may be linked together by a linking device to ensure that the doors move together and to the same extent such a mechanism may be a rack and pinion linking device enclosed within the casing of the videophone 100. The doors 112, 114 may be used to shield the video display and the camera literally whilst the videophone is in use.

Should the user not wish to be overlooked or overheard, movement of the doors to an intermediate position between the fully open and closed positions will provide the user with increased privacy.

The hinges attaching the doors 112, 114 to the central portion 110 may have a predetermined number of settings, for example, a fully open setting, an intermediate setting and a closed setting. The predetermined settings may be defined by a cam mechanism in each of the hinges.

Alternatively, the movement of the doors may be continuous from the fully open position to the fully closed position.

The inside of the doors 112, 114 in the embodiment described are made of a lighter coloured material to improve the lighting conditions by reflecting ambient light into the face of the use to improve the video image captured by the video camera 124.

In use, the user will open the doors 112, 114 of the videophone 100, and position it at an appropriate height to capture the required image. Using the removable stylus and the touch-screen, the user will input the requested number and initiate the call. When connected, the user may choose to use the integral speakers and microphone, or alternatively may use the removable ear-piece 130 if the user does not wish the telephone conversation to be broadcast through the speakers 116, 118. Furthermore, although the videophone 100 provides the ability for the user to transmit the video images stored and captured by the camera 124 should the user not wish to take advantage of this, the video camera 124 can be disabled. With the doors 112, 114 in the fully open position the videophone will stand on a suitable surface and the user can conduct the telephone conversation in an open manner. The display will display any video image received from the other party to the call if that party is also using a videophone. The microphones 120, 122 will pick up stereo sound from the area immediately adjacent the videophone 100. In this open manner it is envisaged that the videophone may be used as a video conferencing device where several users may communicate with the other party to the conversation at the same time.

If the videophone 100 is being used in a more public environment, the user may partially close in the doors 112, 114 to shield the display 126 from public view and/or to allow the other party to the call to view only a relatively narrow field of view from the video camera 124.

Thus, the videophone 100 may be used as a portable handheld multi-user video conferencing terminal or in the alternative for an individual user to conduct more private video conversations, even when in public, as required.

It will be appreciated that different stand mechanisms to that disclosed above can be employed. The battery 132 may pivot out from the central portion 110 of the videophone 100 to create a rear stand for the videophone.

It will be appreciated that the videophone may only comprise on microphone and one speaker. Furthermore, the microphone and or speaker need not be mounted on the door portions, but may be mounted on the central portion 110.

Additionally, the camera 124 need not be mounted above the display 126 but may be mounted in any position capable of receiving an image of the user.

FIGS. 4 to 7 illustrate a second embodiment of a videophone. In this embodiment, a mobile videophone 200 consists of an upper half 202 and a lower half 204 connected via a hinge mechanism 206. The functional elements illustrated in FIG. 1, other than the IR interface (which may, however, be provided) are contained within and distributed between the upper half 202 and the lower half 204 of the device.

The hinge mechanism 206 includes abutting surfaces 208, 210 on each of the upper and lower halves 202, 204, which include an outer covering of rubberised material and display a circular sector in cross section where the two abutting surfaces contact through a range of relative positions of the first half 202 with respect to the second half 204. The abutting surfaces 208, 210 are rubberised in order to provide non-slipping frictional contact between the two surfaces 208, 210. In an alternative arrangement, the abutting surfaces may be cogged to prevent mutual slippage.

A hinge clip 212 connects the upper half 202 and lower half 204, and maintains the abutting surfaces 208, 210 in contact throughout the range of relative positions of the upper and lower halves 202, 204. Flexible electrical contacts between the functional elements illustrated in FIG. 1 contained within the upper and lower halves 202, 204 are routed through the hinge clip 212.

Figure 4:
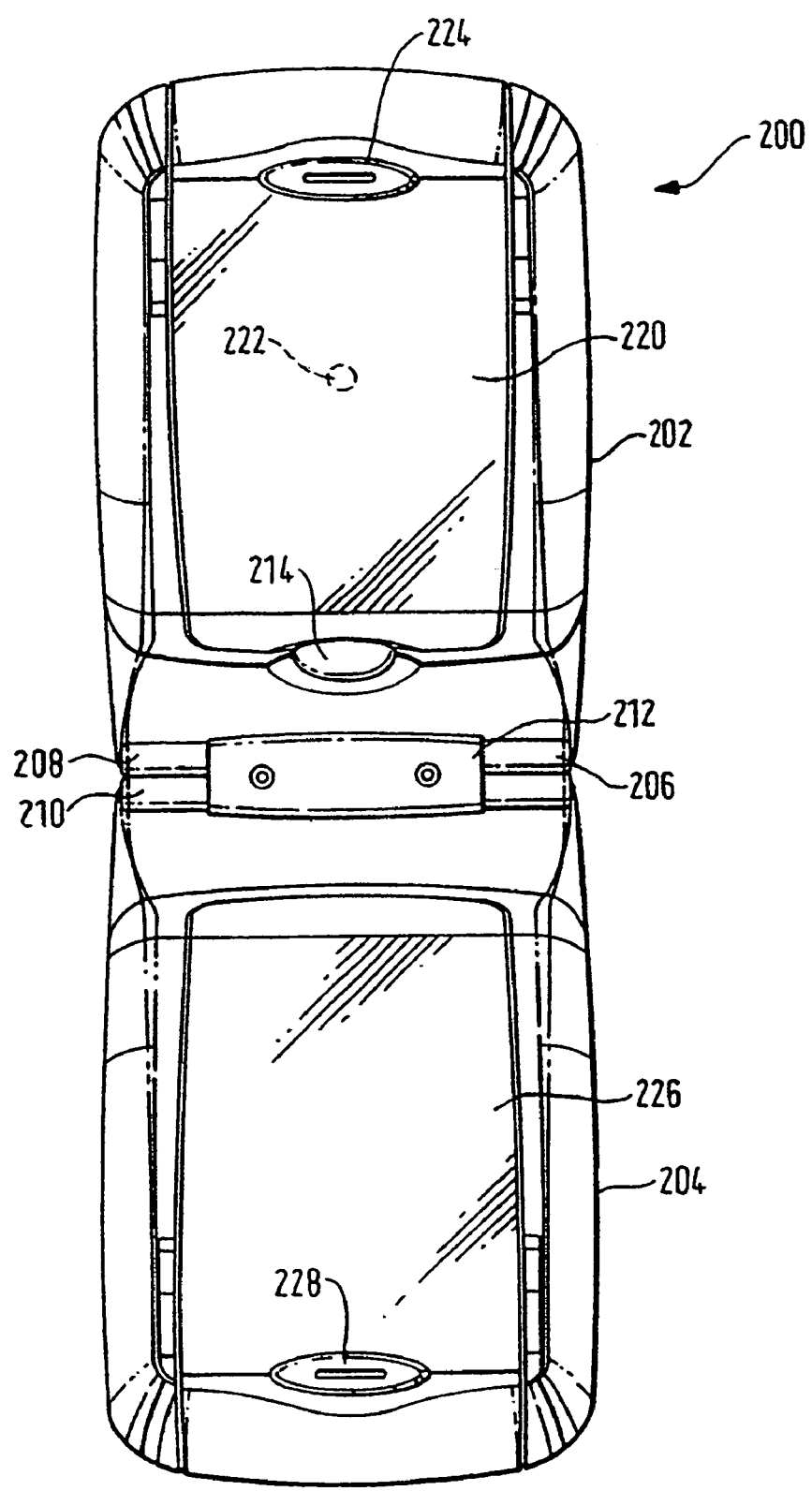
FIG. 4 is a plan view of a further embodiment of a videophone, in an open position.
Figure 5:
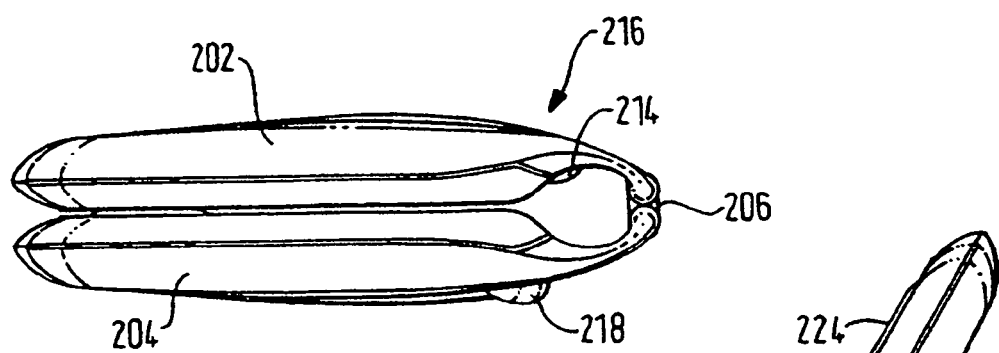
FIG. 5 is a side view of the videophone of FIG. 4, in a fully closed position.

The upper and lower halves 202, 204 are substantially identical in outer shape, save for two features. A call status button 214 is provided on the upper half 202. The call status button 214 is exposed on the inner surface of the upper half 202, as shown in FIG. 4, and is also exposed on the outer surface of the upper half 202, in location 216 illustrated in FIG. 5. Therefore, the call status button 214 is visible both when the videophone 200 is in a closed state, as illustrated in FIG. 5 on the outer surface of the videophone 200, and when the videophone is in the open state, as illustrated in FIG. 4, when viewed from the lower surface of the upper half 202.

The call status button 214 contains three differently coloured light emitting diodes, and is translucent. The light emitting diodes consist of a green light emitting diode, a red light emitting diode and a blue light emitting diode, such that selective actuation of the light emitting diodes in different combinations provide a range of colours on the call status button 214 whereby the call status may be ascertained. For example, the green light emitting diode may be actuated alone in order to indicate an incoming call. The red light emitting diode may be actuated alone in order to indicate the end of a call. Other call status states may be indicated by actuation of the light emitting diodes in different combinations.

The call status button 214 is also operable either from the inside surface of the upper half 202 or from the outside surface of the upper half 202. That is to say, the button may be pressed in order to alter the call status either when the videophone 200 is in an opened state or in a closed state. Pressing of the button may for example act to place the videophone in an off-hook call status when an incoming call is signalled by actuation of the green light emitting diode.

The lower half 204 is provided with support projections 218, located on either side of the lower half 204 at the rear of the lower half 204, in order to provide stability when the videophone is placed on a horizontal surface. The lower half 204 of a videophone therefore adopts a predetermined disposition when placed on a horizontal surface.

The upper half 202 is provided with a liquid crystal display 220 for displaying video image received via a radio interface of the mobile communications system. The liquid crystal display panel 220 may consist on any suitable known LCD-type display, these being of the type whereby voltages are selectively applied across pixels of the display, via transparent electrodes running through the plane of the display, in order to display a desired image. The display 220 may be either a colour display or a black and white display.

A CCD video camera 222 is located substantially in the centre of the display panel 220, immediately behind it within the body of the upper half 202. At least when the video camera 222 is actuated, at least a portion of the display panel 220 located immediately in front of the video camera 222 is maintained in a transparent state.

The video display 220 may be actuated to display an image simultaneously with operation of the video camera 222. During such simultaneous operation of the video camera and the display 220, for example during a video conference, a small area of the display 220, being the area situated immediately in front of the video camera 222, is maintained in a transparent state by selectively addressing pixels of the LCD display located in that small area so as to maintain the small area in a constantly transparent state during image reception at the video camera 222. Thus, the image displayed on video display 220 is a conventional image, with a small part, located in the small area described, in which no image information is displayed.

Alternatively, the image may be displayed with lesser intensity in the small area described that in the remainder of the display panel 220, so as to improve the quality of the image displayed to the user whilst allowing the video camera to receive sufficiently constant levels of light via the small area of the display panel 220 to provide a desired quality of image pick up.

The upper half 202 also comprises an audio portion 224, behind which a microphone and a loudspeaker are located.

The lower half 204 comprises an LCD video display 226 essentially identical to the video display 220 described as contained in the upper half 202, save that no video camera is provided in the lower half 204, and therefore that a full image may be displayed over the entire display 226.

The lower half 20 also contains an audio portion 228, which, similar to audio portion 224, has an audio loudspeaker and an audio microphone located behind it.

Figure 6:
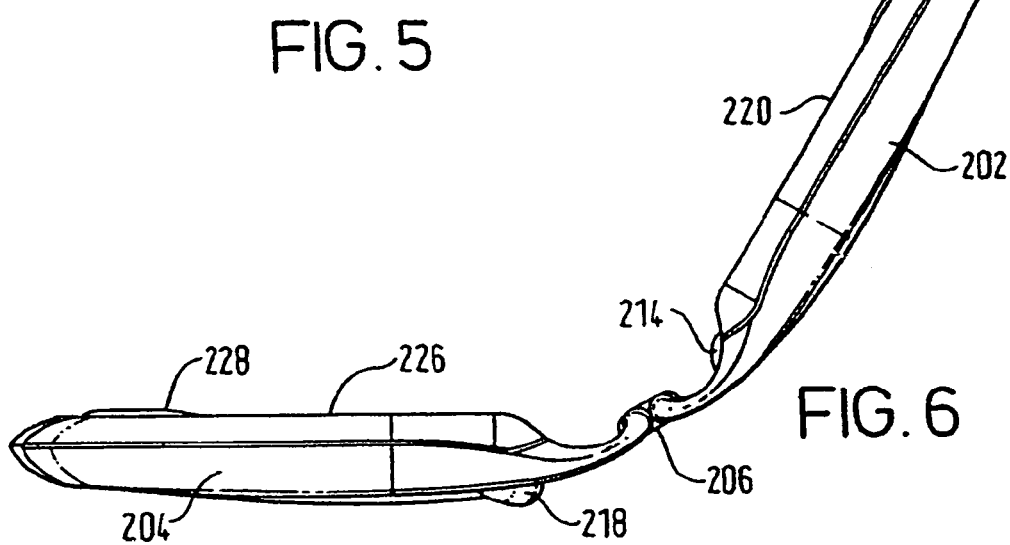
FIG. 6 is a side view of the videophone of FIG. 4, in an open position.

FIG. 4 is a plan view of the videophone 200 corresponding with a side view illustrated in FIG. 6. In the positioning illustrated in these views, the videophone 200 may be used in various alternative modes of use.

In a first mode of use, the lower half 204 of the videophone is placed on a horizontal surface, or is hand held, such that the upper half 202 is oriented vertically and such that the display panel 220 faces the user. In this mode, an image of the user may be picked up on the video camera 222 and transmitted via the radio interface of the mobile communications system, and a video image of a remote party received via the radio interface of the mobile communications system may be displayed on the display panel 220. In addition, the view of the user picked up by the video camera 222 may be displayed on the lower display panel 226, in order to provide a means whereby the user may monitor the image picked up by the video camera 222 during and prior to video image transmission during a call.

The upper and/or lower display panels 220 and 226 are provided with a touch-sensitive membrane. Either the upper display panel 220 and/or the lower display panel 226 may also therefore be used as a man machine interface, combined with iconic and/or alphanumeric displays of videophone functions displayed on the respective panel, in order to allow control of the videophone functions before and during a call transmitted via the videophone.

During a video conference, audio signals consisting of the voice of the user may be picked up on either, or both of, the microphones contained in the audio portions 224, 228. Audio signals, consisting of the voice of the remote party, received via the radio interface of the mobile communications system, may be output via the loudspeakers contained in either or each of the audio portions 224, 228.

In a second mode of operation, the videophone 200 is used as a conventional mobile telephone handset, namely the videophone 200, when oriented in a state similar to that illustrated in FIG. 6, is held against the head of the user such that one of the audio portions 224, 228 rests adjacent the ear of the user and the other of the audio portions 224, 228 rests adjacent the mouth of the user. Since a microphone and a loudspeaker are provided in each of the audio portions 224, the videophone 200 may be oriented in two alternative positions during usage in this mode. That is to say, either the audio portion 224 may be held against the ear of the user, with the audio portion 228 held adjacent the mouth of the user, or the audio portion 228 may be held against the ear of the user, with the audio portion 224 held adjacent the mouth of the user. The videophone 200 is preferably arranged to actuate only a single combination of microphone and loudspeaker in the audio portions 224, 228, as required, when operating in this mode.

In a further mode of use, the videophone 200 may be oriented in a direction normal to that described above, namely with videophone extending horizontally when opened out, with the upper half 202 located on the right, and the lower half 204 located on the left, with respect to the user. In this mode, one or more images may be shown on the display panels 220, 226 simultaneously. Furthermore, the microphones and/or loudspeakers provided in each of the audio portions 228 and 224 provide either stereophonic audio output or stereophonic audio reception, or both.

The mode of usage, namely any of the videophone modes described above or the conventional mobile telephone handset mode described above, may be selected by the user via the man machine interface, i.e., by touch-screen selection in a control portion of the display panels 220, 226.

In one embodiment, the videophone is provided with Internet browsing capabilities. Namely, by providing the videophone 200 with an Internet browser application, and appropriate data communications capabilities via the radio interface of the mobile communications system, the mobile videophone 200 may provide Internet access. For example, a World Wide Web page may be retrieved and displayed one or more the display panels 220, 226. Hyperlinks may be selected by appropriate interaction with the touch-screen man machine interface. With a suitable radio interface, both HTML pages and video data may be received and displayed simultaneously on different of the display panels 220, 226.

Figure 7:
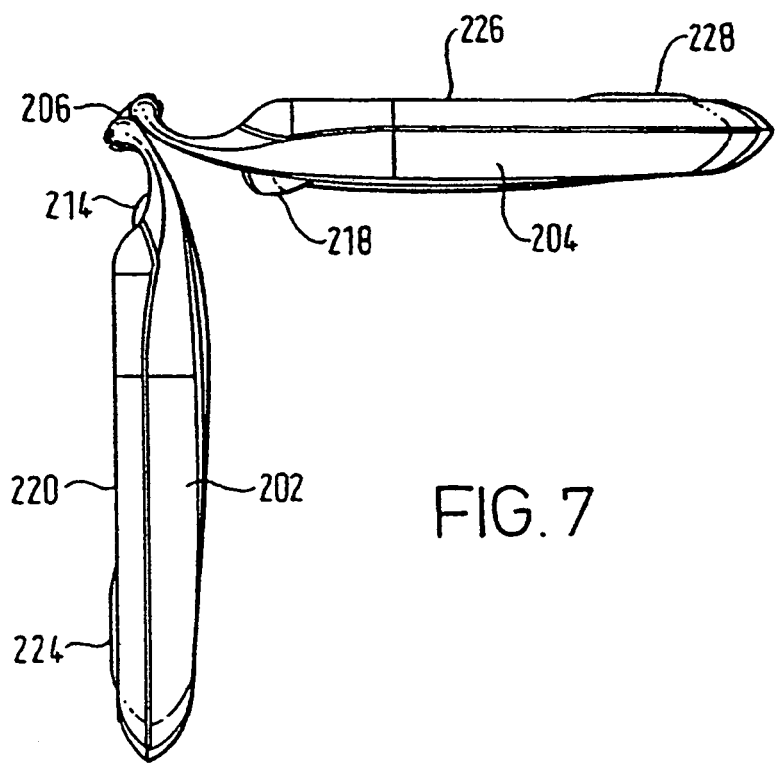
FIG. 7 is a side view of the videophone of FIG. 4, in a fully open position.

A further feature of the videophone 200 relates to functionality enabled by the hinge mechanism 206. Namely, the hinge 206 allows pivoting of the upper half 202 relative to the lower half 204 from the closed position in which both halves are located in parallel planes, as illustrated in FIG. 5, continuously through intermediate positions, in which the upper half is stably oriented with respect to the lower half (so that the halves maintain their relative positions even when free-standing), such as that shown in FIG. 6, continuously through to a fully open position as illustrated in FIG. 7. The lower half 204 is therefore stably positionable at any of a large number of positions between the closed position of FIG. 5 and the fully open position of FIG. 7.

As will be appreciated, with the videophone 200 handheld and arranged as illustrated in FIG. 7, the user may direct the video camera 222 in a direction facing directly away from the user, quite comfortably, such that the image transmitted by the videophone 200 over the radio interface of the mobile communications network consists not of an image of the user, but of an image of objects located directly in front of the user. In this manner, the user may readily illustrate to a remote party what he himself can view. Thus, during a single video conference, the user may orient the upper half 202 relative to the lower half 204 in a plurality of different positions, whilst continuously holding the lower half 204 in one hand and to face the user, thereby allowing the remote party to view various different objects whilst the user himself may continue to view the image displayed on the lower display panel 226. As discussed above, this image may consist of the image picked up by the video camera 222. Alternatively, or additionally, this image may consist of the image of the remote party communicated over the radio interface of the mobile communications system.

Thus, it will be appreciated that the videophone 200 provides a wide variety of modes of usage, and modes of video display and display of control graphics in a man machine interface, which remains convenient to the user. The user may select any of the modes of usage, via the man machine interface, as per a personal preference, or in accordance with the type of images to be displayed on the videophone 200. In addition to the video conferencing mode of usage described above, and the Internet browsing display still images received via the radio interface of the mobile communications network. Correspondingly, the video camera 222 may be used to pick up still images for transmission via the radio interface of the mobile communications system.

The videophone 200 may also be used to receive television programs, in which case the videophone 200 is preferably oriented in the horizontal position described above, to provide stereophonic audio sound, with the television program displayed on either, or each of, the display panels 220, 226.

By providing the capability of orienting the upper half 202 with respect to the lower half 204 at a whole variety of operational positions, including the position illustrated in FIGS. 4 and 6 and positions in which the upper half 202 is positioned more closely to the lower half 204, the user may select a degree of privacy of viewing as desired. Thus, the videophone 200 may be used as a portable multi-user video conferencing terminal or in the alternative for an individual user to conduct more private video conversations, even when in public, as required.

It will be appreciated that it is not necessary for there to be two speakers and two microphones, and that the microphone and speaker need not be positioned at different audio portions of the device for use as a videophone.

The camera 222 need not be mounted centrally of the display panel 220. Indeed, although it is preferred, the camera need not be mounted immediately behind the display panel 220, but may be located adjacent it on the housing of the upper half 202. Alternatively, the camera can be mounted in the lower half 204. In all the alternatives described, the video camera should be readily orientable to capture a view of the user.

Finally, the invention is not limited in application to videophones. Aspects if the invention may be implemented in other types of mobile terminal, such as mobile telephone handsets, cordless telephone handsets, portable television receivers, etc.

It is to be understood that the embodiments described above are preferred embodiments only. Namely, various features may be omitted, modified or substituted by equivalents without departing from the scope of the present invention, which is defined in the accompanying claims.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A mobile telephone handset comprising a radio telecommunications interface for wirelessly transmitting and receiving radio signals to and from a mobile telecommunications network, the handset comprising:
    first and second audio loudspeakers positioned to output audio from two different locations on the handset;
    a first portion and a second, different portion, wherein the second portion is attached to the first portion, wherein the first audio loudspeaker is mounted on the first portion and the second audio loudspeaker is mounted on the second portion, wherein the first and second loudspeakers are located near the ends of the first and second portions respectively, wherein the ends are each remote from the location of the attachment between the first and second portions;
    a graphics display configured to generate video output, wherein the graphics display is mounted on the first portion; and
    a man machine interface, wherein the man machine interface is mounted on the second portion,
    wherein the first and second portions are movable from a first relative position, in which the handset is compact and in which the audio loudspeakers are relatively closely spaced, to a second relative position in which the audio loudspeakers are relatively widely spaced,
    wherein when the handset is in the second relative position, the handset is capable of operating in at least a first operating mode and a second operating mode,
    wherein when the handset is in the second relative position and in the first operating mode, the handset is adapted to generate a stereophonic audio output from the first and second audio loudspeakers, and
    wherein when the handset is in the second relative position and in the second operating mode, the handset is adapted to operate as a conventional mobile telephone handset such that when the handset is held against the head of a user, an audio loudspeaker rests adjacent an ear of the user and a microphone rests adjacent the mouth of the user.

2. The mobile telephone handset according to claim 1, wherein the first and second portions are pivotally connected by a hinge mechanism such that the first and second portions are rotatable about a common axis relative to one another, from the first relative position to the second relative position.

3. The mobile telephone handset according to claim 2, wherein the first and second loudspeakers are located near to ends of the first and second portions respectively, which ends are each remote from the pivotal connection.

4. The mobile telephone handset according to claim 1, wherein the second portion includes an image capture device.

5. The mobile telephone handset according to claim 4, wherein movement of the first portion relative to the second portion allows the image capture device to be orientated in a plurality of imaging positions, including:
    (i) a first imaging position in which the image capture device is orientated in substantially the same direction as the graphics display, allowing the image capture device to pick up images of a user; and
    (ii) a second imaging position in which the image capture device is orientated in substantially the opposite direction as the graphics display, allowing the image capture device to pick up images of objects being viewed by the user while the user may also view the graphics display.

6. The mobile telephone handset according to claim 5, wherein the first portion is rotatable with respect to the second portion by more than 180°.

7. The mobile telephone handset according to claim 1, wherein in the second relative position the loudspeakers can be positioned to transmit the stereophonic audio output to a user in front of the handset.

8. The mobile telephone handset according to claim 7, wherein the handset is configured to support the first and second portions, while in the second relative position, on a horizontal surface.

9. The mobile telephone handset according to claim 1, wherein the radio telecommunications interface is configured to derive data from the radio signals, wherein the data is converted by a conversion function to a format suitable for audio output via the loudspeakers.

10. The mobile telephone handset according to claim 1, wherein the handset includes a graphics display and the graphics display is covered when the handset is in the first relative position and uncovered when the handset is in the second relative position.

11. The mobile telephone handset according to claim 1, wherein when in the second relative position, the handset is capable of operating in a third operating mode, and wherein the graphics display is configured to display video data to a user in front of the handset.

12. The mobile telephone handset according to claim 11, wherein the radio telecommunications interface is configured to derive video data from the signals, wherein the data is converted by a conversion function to a format suitable for video output via the graphics display.

13. The mobile telephone handset according to claim 12, wherein when the handset is in the second relative position, the handset is configured to operate in a fourth operating mode wherein the handset is adapted to perform the video output in conjunction with the stereophonic audio output.

14. A mobile telephone handset comprising a radio telecommunications interface configured for wirelessly transmitting and receiving radio signals to and from a mobile telecommunications network, the handset comprising:
    first and second audio loudspeakers positioned to output audio from two different locations on the handset;
    a first portion and a second, different portion, wherein the second portion is attached to the first portion, wherein the first audio loudspeaker is mounted on the first portion and the second audio loudspeaker is mounted on the second portion, wherein the first and second loudspeakers are located near the ends of the first and second portions respectively, wherein the ends are each remote from the location of the attachment between the first and second portions;

a graphics display configured to generate video output, wherein the graphics display is mounted on the first portion; and a man machine interface, wherein the man machine interface is mounted on the second portion, wherein the first and second portions are movable from a first relative position, in which the handset is compact and in which the audio loudspeakers are relatively closely spaced, to a second relative position in which the audio loudspeakers are relatively widely spaced, wherein the first and second portions are pivotally connected by a hinge mechanism such that the first and second portions are rotatable about a common axis relative to one another, from the first relative position to the second relative position, wherein the handset is configured to operate in at least a first operating mode and a second operating mode when in the second relative position, wherein the handset is adapted to generate a stereophonic audio output from the first and second audio loudspeakers and the first and second audio loudspeakers can be positioned to transmit the stereophonic audio output to a user in front of said handset when the handset is in the second relative position and operating in the first operating mode, and wherein when in the second relative position and in the second operating mode, the handset is configured to operate as a conventional mobile telephone handset such that when the handset is held against the head of the user, an audio loudspeaker is positioned adjacent to an ear of the user and a microphone is positioned adjacent to the mouth of the user.

15. A mobile telephone handset comprising a radio telecommunications interface for wirelessly transmitting and receiving radio signals to and from a mobile telecommunications network, the handset comprising:

first and second audio loudspeakers positioned to output audio from two different locations on the handset;

a first portion and a second, different portion, wherein the second portion is attached to the first portion, wherein the first audio loudspeaker is mounted on the first portion and the second audio loudspeaker is mounted on the second portion, wherein the first and second loudspeakers are located near the ends of the first and second portions respectively, wherein the ends are each remote from the location of the attachment between the first and second portions;

a graphics display configured to generate video output, wherein the graphics display is mounted on the first portion; and a man machine interface, wherein the man machine interface is mounted on the second portion, wherein the first and second portions are movable from a first relative position, in which the handset is compact and in which the audio loudspeakers are relatively closely spaced, to a second relative position in which the audio loudspeakers are relatively widely spaced, wherein the first and second portions are pivotally connected by a hinge mechanism such that the first and second portions are rotatable about a common axis relative to one another, from the first relative position to the second relative position, wherein the first and second loudspeakers are located proximate ends of the first and second portions respectively, which are each remote from the pivotal connection, wherein when the handset is in the second relative position, the handset is configured to operate in at least a first operating mode and a second operating mode, wherein when the handset is in the second relative position and operating in the first operating mode, the handset is adapted to generate a stereophonic audio output from the first and second audio loudspeakers and to generate video output from the graphics display, the first and second audio loudspeakers and the graphics display being positioned to transmit the stereophonic audio output in conjunction with the video output to a user in front of the handset, and wherein when the handset is in the second relative position and in the second operating mode, the handset is configured to operate as a conventional mobile telephone handset such that when the handset is held against the head of the user, an audio loudspeaker is positioned adjacent to an ear of the user and a microphone is positioned adjacent to the mouth of the user.

16. The mobile telephone handset according to claim 1, wherein the operating mode of the handset can be selected by a user via the man machine interface when in the second relative position.

17. The mobile telephone handset according to claim 16, wherein the man machine interface provides for touchscreen selection.

* * * * *